US010275789B1

(12) United States Patent
Ramalingam et al.

(10) Patent No.: US 10,275,789 B1
(45) Date of Patent: Apr. 30, 2019

(54) TRACKING ONLINE IMPRESSIONS TO OFFLINE PURCHASES

(71) Applicant: Amazon Technologies, Inc., Seattle, WA (US)

(72) Inventors: Harsha Ramalingam, Kirkland, WA (US); Michael Carr, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/391,235

(22) Filed: Dec. 27, 2016

Related U.S. Application Data

(60) Division of application No. 14/231,401, filed on Mar. 31, 2014, now Pat. No. 9,576,299, which is a continuation of application No. 13/171,035, filed on Jun. 28, 2011, now Pat. No. 8,688,524.

(51) Int. Cl.
*G06Q 30/00* (2012.01)
*G06Q 30/02* (2012.01)

(52) U.S. Cl.
CPC ..... *G06Q 30/0246* (2013.01); *G06Q 30/0261* (2013.01); *G06Q 30/0267* (2013.01); *G06Q 30/0273* (2013.01)

(58) Field of Classification Search
CPC ........ G06Q 20/20; G06Q 30/06; G06Q 30/02; G06Q 20/204; G07G 1/12
USPC ... 705/15–21, 26.1, 26.35, 26.61, 26.7, 26.9
See application file for complete search history.

(56) References Cited

U.S. PATENT DOCUMENTS

| | | | |
|---|---|---|---|
| 7,014,104 B2 | 3/2006 | MacFarlane et al. |
| 7,356,477 B1 | 4/2008 | Allan et al. |
| 7,472,075 B2 | 12/2008 | Odinak et al. |
| 7,499,874 B2 | 3/2009 | Singh et al. |
| 7,540,408 B2 | 6/2009 | Levine et al. |
| 7,568,211 B2 | 7/2009 | Mai et al. |
| 7,599,856 B2 | 10/2009 | Agrawal et al. |
| 7,630,986 B1 | 12/2009 | Herz et al. |
| 7,711,604 B1 | 5/2010 | Walker et al. |

(Continued)

OTHER PUBLICATIONS

Office action for U.S. Appl. No. 13/171,035, dated May 21, 2013, Ramalingam et al., "Tracking Online Impressions to Offline Purchases", 6 pages.

(Continued)

*Primary Examiner* — Andrew Joseph Rudy
(74) *Attorney, Agent, or Firm* — Lee & Hayes, P.C.

(57) ABSTRACT

Customers receive advertisements or "impressions" related to brick and mortar merchants while accessing online content. The merchants or other entities track which impressions correlate with customers coming to a physical store and conducting a transaction (e.g., making a purchase) by comparing transaction information with information about the customer that is provided by the source of online impressions. In one implementation, the merchant creates a hash from the customer's name and account number on a payment card. This hash is compared with a hash from the impression provider that is generated using the same technique. When a match is found, it is inferred that exposure to the online impression caused the customer to make a purchase at the physical store. Merchants may pay the impression providers an advertising or referral fee based on the matches.

20 Claims, 8 Drawing Sheets

(56) References Cited

U.S. PATENT DOCUMENTS

| | | | |
|---|---|---|---|
| 7,734,632 B2 | 6/2010 | Wang | |
| 7,739,621 B2* | 6/2010 | Knight | G06F 3/04847 |
| | | | 715/810 |
| 7,783,719 B2 | 8/2010 | Miller | |
| 7,818,216 B2 | 10/2010 | Lawhorn | |
| 7,853,533 B2 | 12/2010 | Eisen | |
| 7,860,803 B1 | 12/2010 | Chang et al. | |
| 7,937,291 B2 | 5/2011 | Carlson et al. | |
| 8,041,667 B2 | 10/2011 | Otto et al. | |
| 8,060,399 B2 | 11/2011 | Ullah | |
| 8,131,733 B2 | 3/2012 | Wang | |
| 8,225,995 B1 | 7/2012 | Gangi | |
| 8,239,295 B2 | 8/2012 | Hsu et al. | |
| 8,255,403 B2* | 8/2012 | Kenedy | G06F 17/30867 |
| | | | 705/26.7 |
| 8,265,989 B2 | 9/2012 | Dodge et al. | |
| 8,284,048 B2 | 10/2012 | Faith | |
| 8,380,177 B2 | 2/2013 | Laracey | |
| 8,380,564 B2* | 2/2013 | Huffman | G06Q 30/02 |
| | | | 705/14.49 |
| 8,386,519 B2* | 2/2013 | Kenedy | G06Q 30/0631 |
| | | | 707/784 |
| 8,571,937 B2 | 10/2013 | Rose et al. | |
| 8,676,657 B2 | 3/2014 | Fenton | |
| 8,688,492 B2* | 4/2014 | Kruglick | G06Q 30/0255 |
| | | | 705/7.11 |
| 8,712,839 B2 | 4/2014 | Steinert et al. | |
| 8,756,102 B2 | 6/2014 | Tietzen | |
| 8,788,333 B2 | 7/2014 | Alba et al. | |
| 8,831,677 B2* | 9/2014 | Villa-Real | H04M 1/66 |
| | | | 455/552.1 |
| 8,935,177 B2 | 1/2015 | Wiley et al. | |
| 9,049,234 B2 | 6/2015 | Shuster | |
| 9,049,259 B2* | 6/2015 | Rathod | H04N 21/44222 |
| 9,058,604 B2* | 6/2015 | Carr | G06Q 20/10 |
| 9,135,612 B1* | 9/2015 | Proctor, Jr. | G06Q 20/202 |
| 9,141,953 B2 | 9/2015 | Hazel et al. | |
| 9,436,955 B2* | 9/2016 | Dorsey | G06Q 20/10 |
| 9,454,866 B2* | 9/2016 | Dorsey | G06K 7/084 |
| 9,609,577 B1* | 3/2017 | Ramalingam | |
| 9,619,797 B2* | 4/2017 | Dorsey | G06Q 20/3224 |
| 9,697,520 B2* | 7/2017 | MacIlwaine | G06Q 20/387 |
| 9,723,131 B1* | 8/2017 | Ramalingam | H04M 1/72569 |
| 9,760,885 B1* | 9/2017 | Ramalingam | G06Q 20/35785 |
| 2010/0010887 A1 | 1/2010 | Karlin et al. | |
| 2012/0176509 A1 | 7/2012 | Aravamudan et al. | |

OTHER PUBLICATIONS

Office action for U.S. Appl. No. 14/231,401, dated Jun. 2, 2016, Ramlingam et al., "Tracking Online Impressions to Offline Purchases", 6 pages.

Office action for U.S. Appl. No. 13/171,035, dated Aug. 27, 2012, Ramalingam et al., "Tracking Online Impressions to Offline Purchases", 6 pages.

* cited by examiner

TRACKING ONLINE IMPRESSIONS TO OFFLINE PURCHASES

CROSS REFERENCE TO RELATED APPLICATIONS

This application claims priority to and is a divisional application of U.S. patent application Ser. No. 14/231,401, filed on Mar. 31, 2014, which is a continuation application of U.S. patent application Ser. No. 13/171,035, filed on Jun. 28, 2011, now U.S. Pat. No. 8,688,524, which issued on Apr. 1, 2014, which are incorporated by reference herein.

BACKGROUND

An increasing number of people use the World Wide Web for e-commerce as well as for other purposes. These people represent a source of potential consumers that merchants wish to access. Techniques for referring potential customers to merchants benefits both the merchants, by increasing customer traffic, and the customers, by introducing the customers to merchants that provide goods and services the customers desire.

For example, an e-commerce website may pay an affiliate website for providing customer referrals. The e-commerce merchant may wish to draw potential customers to its website and encourage other website operators to link to the e-commerce website through a hyperlink or similar technology. The users that click through one of the links to the e-commerce website may be tracked by the use of a cookie or tracking token. The use of a cookie makes it possible to know which affiliate website directed the potential customer to the e-commerce website. If the potential customer makes a purchase from the e-commerce website, the e-commerce merchant may pay a commission to the affiliate website for being the source of the customer lead. These techniques have proven effective in the realm of e-commerce, and yet generally remain limited to this environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
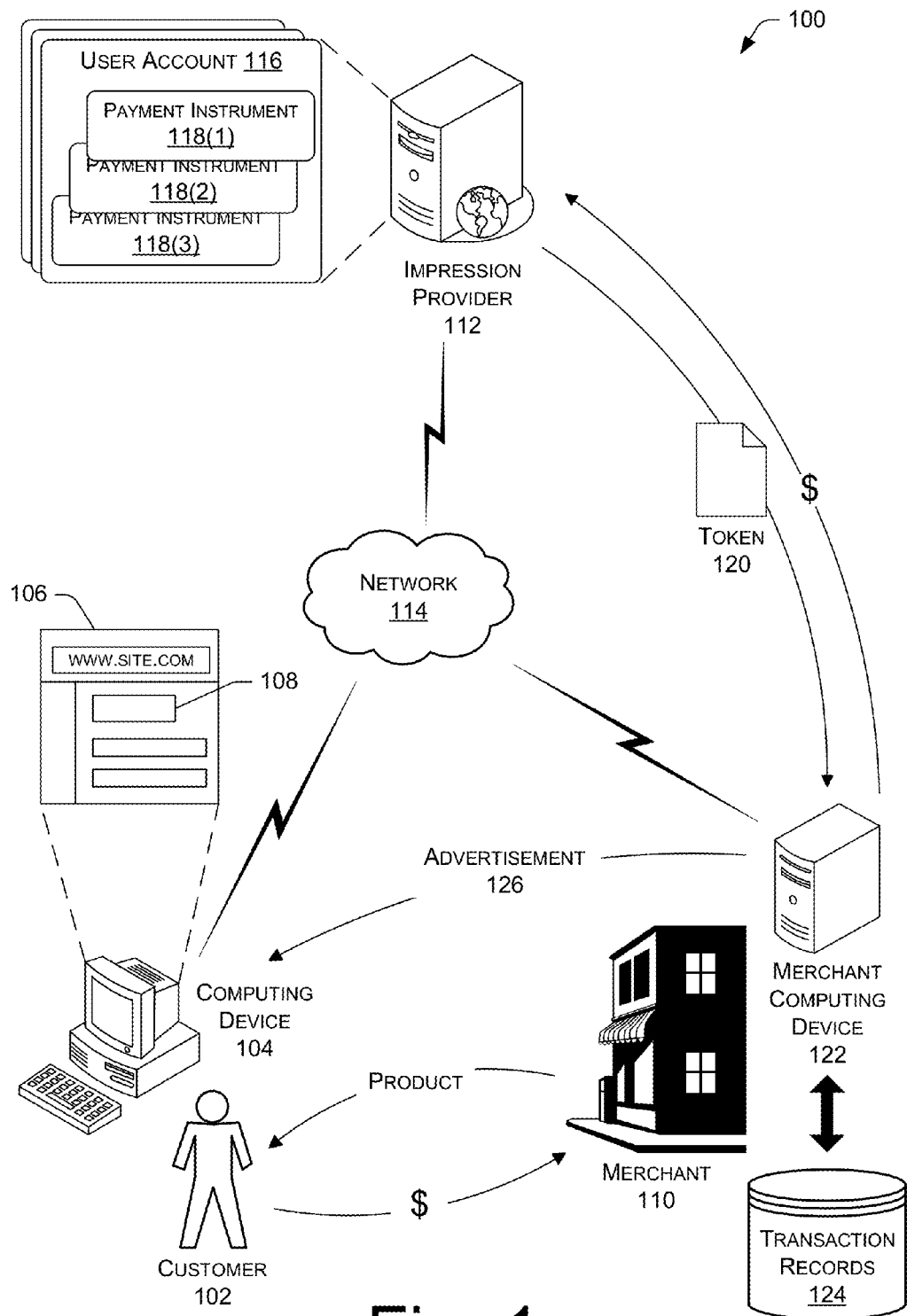
FIG. 1 shows an illustrative architecture for correlating an online impression presented to a consumer with a subsequent purchase by the consumer at a physical location of a merchant.

The document describes, in part, techniques for matching the identity of a user that received an impression or advertisement online to a transaction at a brick-and-mortar merchant. Characteristics about the user that are known to the provider of the online impression and also available to the brick-and-mortar merchant are used to make the match. For example, a combination of the user's name and a number from a payment instrument (e.g., a credit or debit card) may form the basis of the match.

To illustrate, envision that an example Internet user, Adam Jones, is browsing the World Wide Web to learn more about a digital camera that he is considering purchasing. Adam may browse the World Wide Web on any type of computing device such as a desktop computer or a mobile device, such as a Web-enabled mobile phone. E-commerce websites provide information about products such as digital cameras that may be useful to consumers like Adam while researching a potential purchase. The ratings, customer reviews, specifications, prices, and other information that is available on e-commerce websites is equally useful for informing purchasing decisions at brick-and-mortar stores as well as at an e-commerce website. Thus, in some cases, a customer may research online and then make the purchase off-line.

In this example, Adam logs in to his account at favorite online retailer researches the camera that he wishes to purchase. In addition to information such as price and availability, the online retailer's website also provides information about several nearby brick-and-mortar stores the offer the same camera for sale. This exposure to information about local merchants is an advertising "impression" for each of those nearby brick-and-mortar merchants Adam may be shown prices of the camera at the various local merchants, directions to the local merchants, user reviews about those local merchants, and other information. Adam selects one of the local merchants based on the information provided on the online retailer's website.

Adam arrives at the local merchant he selected and purchases the camera with a credit card like any other customer. However, the credit card Adam used is also associated with his account at the online retailer. The local merchant that completed the sale to Adam maintains a record of the transaction that includes the last four digits of Adam's credit card number (i.e., the credit card tail), the cardholder's name (in this case "Adam Jones"), and the amount of money transacted (e.g., $350 for the digital camera).

When the online retailer provided impressions to Adam about the local merchants, the online retailer also created tokens that include information about credit cards associated with Adam's account at the online retailer, which include Adam's name. To protect privacy, the tokens may include a hash derived from Adam's name and the last four digits of any credit card numbers associated with his account. The hash is a unique output combination of letters and numbers that is non-reversible and does not reveal either Adam's name or his credit card number. Thus, even if a third-party obtained the hash it would be difficult or impossible to reverse the process and obtain Adam's name and credit card number. If Adam has multiple credit cards associated with his online retailer account, multiple hash values may be created one for each credit card. A token having the hash value, or values if there are multiple credit cards, is sent to each of the local merchants that appeared in the webpage presented to Adam by the online retailer.

The transaction records maintained by the respective local merchants also include hashes generated in the same way as the hashes used for the tokens sent out by the online retailer. Thus, since Adam used one of his credit cards that is linked to his account with online retailer and the credit card lists Adam Jones as the cardholder, the local merchant can generate an identical hash value because the input data (e.g., Adam's name and the last four digits of the credit card number) are the same as the data available to the online retailer. When a match exists between one of the hash values generated from transaction data at a local merchant and one of the hash values included in a token received from the online retailer, credit for Adam going to the local merchant and purchasing the camera is attributed to the impression provider and by the online retailer's website.

In order to minimize mistaken attribution, such as between two people who have the same name, credit card numbers with the same final four digits, and also shop at the same stores, the matching of entries may also take time into account. For instance, a match may be found if Adam purchased an item within three days (or any other amount of time) from when Adam received the impression on the online retailer's website. In this example, when there is a match within three days, the local merchant pays the online retailer a commission for directing Adam to one of its brick-and-mortar locations to purchase the digital camera. For example, the local merchant may pay $8.75 to the online retailer as a 2.5% commission on the $350 purchase price of the digital camera.

Furthermore, envision that Adam previously opted in to the service in order to receive information from his favorite online retailer about options for purchasing products from local merchants. When Adam next accesses the online merchant's website, he may provide a review about the digital camera itself as well as a review about the buying experience (e.g., customer service) at the local merchant.

The described techniques for attributing a purchase at a brick-and-mortar merchant location to an online impression may be implemented in a number of ways and in a number of contexts. Example implementations and context are provided with reference to the following figures, as described below in more detail. It is to be appreciated, however, that the following implementations and contexts illustrative of many possible implementations and contexts.

Illustrative Architectures

FIG. 1 shows an illustrative architecture 100 in which a customer 102 employs a computing device 104 to access online content such as a webpage 106. The computing device 104 may be any type of computing device such as a desktop computer, notebook computer, tablet computer, mobile phone, personal digital assistant, portable media player, eBook reader, and the like. The webpage 106 may include an "impression" 108 that advertises or otherwise provides information related to a merchant 110. The merchant 110 may be a brick-and-mortar merchant that has only physical store locations or the merchant 110 may have an e-commerce website as well as physical store locations. The webpage 106, or at least the impression 108, is provided by an impression provider 112 via a network 114 to the computing device 104 used by the customer 102. The network 114 may be any type of communications network such as the Internet, a cable network, a telephone network, a mesh network, a peer-to-peer network, and the like.

In some implementations, the impression provider 112 may be an online retailer or an e-commerce merchant. The impression provider 112 may be separate from the merchant 110 in that each is controlled by separate entity and are separate businesses. The impression provider 112 includes a plurality of user accounts associated with different users such as user account 116 associated with the customer 102. The user account 116 includes information about payment instruments 118 associated with the customer 102. For example, the payment instruments 118 may include a first credit card 118(1), a second credit card 118(2), and a checking account 118(3) that the customer 102 has chosen to associate with his user account 116 at the impression provider 112. In implementations in which the impression provider 112 is an online retailer, the payment instruments 118 may be included in an online "wallet" for providing ease of payment when making purchases from the online retailer.

When the customer 102 is viewing the website 106 while logged into his user account 116 at the impression provider 112, the impression provider 112 is able to associate the impression 108 with the customer 102 and thus with the customer's payment instruments 118. The impression provider 112 can encapsulate information about the impression 108 presented to the customer 102 in a token 120. The token 120 may indicate that the customer 102 was provided the impression 108, include the name or other identifier for the customer 102, and may also include information about one or more of the payment instruments 118 associated with the user account 116. The information included in the token 120 may be encrypted, represented by a hash, or otherwise secured.

In some implementations, the impression provider 112 may store a copy of the token 120 or store the same data that is included in the token 120. That data may be used by the impression provider 112 for internal analytics. The impression provider 112 may also receive information about transactions from the merchant 110. The information from the merchant 110 may be sent to the impression provider 112 together with payments for impressions 108. Analysis performed by the impression provider 112 of the data from the token 120 may be combined with analysis of transaction data from the merchant 110.

The token 120 can be provided to the merchant 110 such as to a merchant computing device 122 via the network 114. The token 120 may also be stored at the impression provider 112 or another location until requested by the merchant 110. The merchant 110 may pull the tokens to the merchant computing device 122 for matching. The merchant 110 may also maintain transaction records 124 that may include information about transactions such as sales of goods and services made at the physical location of the merchant 110. The transaction records 124 may include customer names, information about payment instruments used by the customers, products (e.g., goods and/or services) purchased by the customers, the prices of the products, a total price of a transaction, the date and time of the transaction, and the like.

The merchant computing device 122 may compare information in the token 120 with information from the transaction records 124 to determine if there is a match. For example, a match may be made between a payment instrument used to make a purchase at the merchant 110 and therefore stored in the transaction records 124 with information on one of the payment instruments 118 from the user account 116 that is included in the token 120. Other combinations of information to identify a match are also possible. For example, a portion of a number associated with a payment instrument 118 such a credit card tail (i.e., the last four numbers of the credit card number) or a partial bank routing number may be combined with the customer's 102 name (e.g., first and/or last).

When a match is identified, the presence of the match is used to attribute the sale of a product at the merchant 110 to the impression 108 that was provided to the customer 102. The impression 108 may receive attribution for a transaction during a limited time window following the presentation of the impression 108 to the customer 102. For example, the time window may be 24 hours, three days, one week, or another length of time. A timestamp included with the token 120 may be compared with the time of a transaction as recorded in the transaction records 124 to determine if a match that occurred within a predetermined time window.

Once a match has been made and a transaction is attributed to an impression 108, the merchant 110 may pay the impression provider 112 for providing the impression. An amount of the payment may be based on a transaction amount of the transaction that matched the information in the token 120. For example, the amount of payment may be a percentage of the total transaction amount. If the impression 108 is provided in conjunction with a particular product that may also be shown on the website 106, the amount of payment may be based on the purchase price of that particular product. Alternatively, the payment amount may be based on both the purchase price of the particular product at a first percentage (e.g., a higher commission rate) and the remainder of the total transaction at a second percentage (e.g., a lower commission rate). The payment amount may be based on how soon a transaction occurs after the impression 108 is provided to the customer 102. For example, the impression provider 112 may be paid a higher commission rate by the merchant 110 the sooner the customer 102 purchases the product after receiving the impression 108. The amount of the payment may be based on any other combination of factors such as transaction price, transaction time, and the like.

The merchant 110 may also contact the customer 102 after receiving the token 120 even if the token 120 does not match data in the transaction records 124. Receiving the token 120 informs the merchant 110 that the customer 102 has received an impression 108 related to the merchant 110. Accordingly, the merchant 110 may wish to follow up the impression 108 with one or more secondary impressions such as a further solicitation to come to the merchant's brick-and-mortar location. The merchant 110 may send a targeted advertisement 126 to the computing device 104 of the customer 102. The customer 102 may choose to opt in or opt out of receiving the targeted advertisements 126. If the customer 102 opts in, the merchant 110 may follow-up after an impression 108 by sending a secondary communication to the customer 102 based on the token 120.

Figure 2:
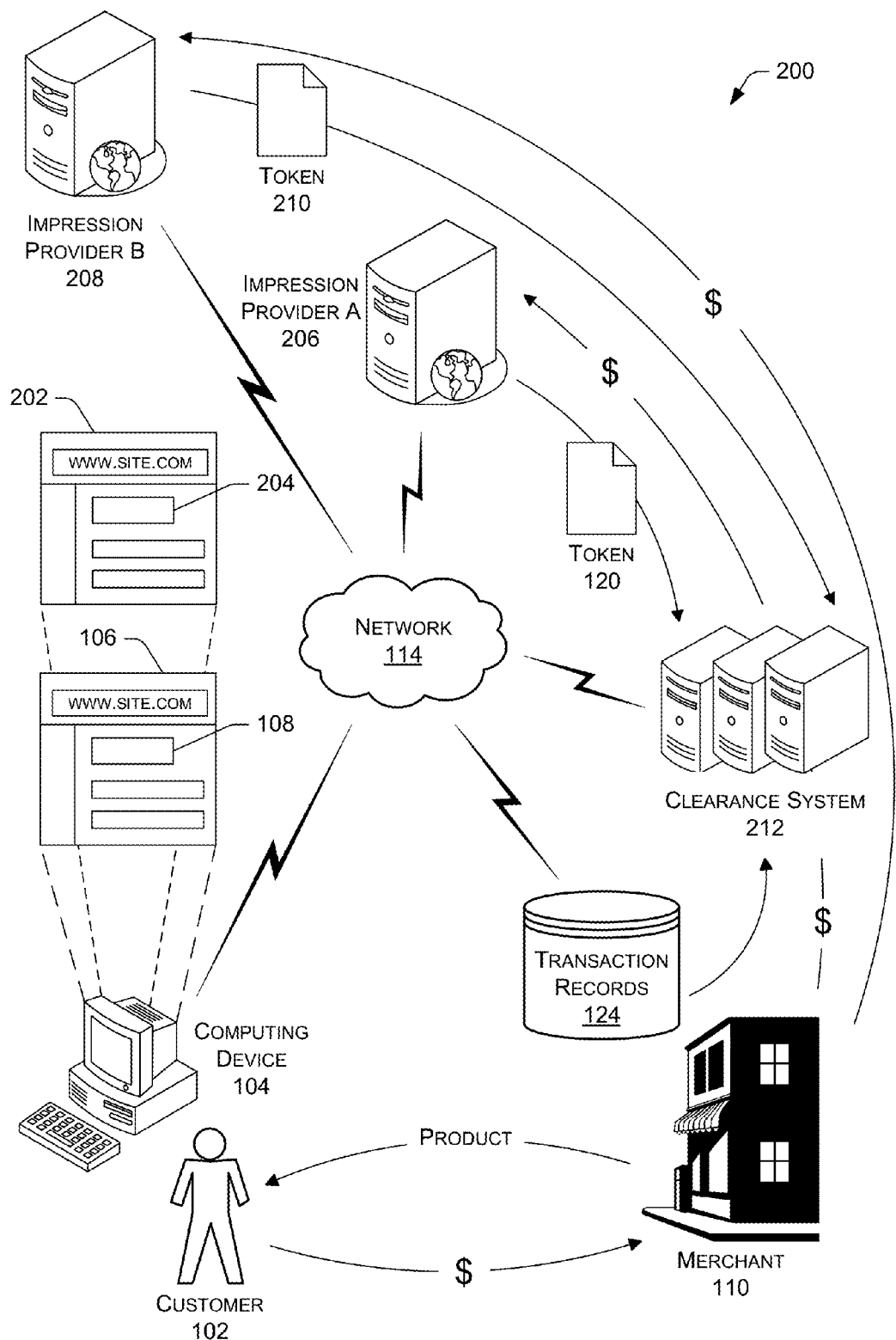
FIG. 2 shows an illustrative architecture for using a code provided by the customer to determine which of multiple online impressions caused the customer to make a purchase at a physical location of a merchant.

FIG. 2 shows an illustrative architecture 200 similar to the architecture 100 shown in FIG. 1. However, in the architecture 200 the customer 102 accesses additional web content such a second website 202 that includes a second impression 204 advertising or promoting the merchant 110. Thus, the customer 102 has received two separate impressions 108 and 204 related to the merchant 110. The first impression 108 may be provided by impression provider A 206 and the second impression 204 may be provided by impression provider B 208. This may occur if, for example, the merchant 110 chooses to advertise with multiple impression providers. Each impression provider 206 and 208 may provide their respective tokens 120 and 210 to a clearance system 212. In an alternative implementation, a single impression provider such as impression provider A 206 may syndicate impressions 108 and 204 to multiple websites 106 and 202.

The clearance system 212 may perform matching between the tokens 120 and 210 and information from the transaction records 124 of the merchant 110. Rather than the matching being performed by the merchant computing device 122 shown in FIG. 1, determining matches at the clearance system 112 may provide a more transparent and trustable system for both the impression providers 206 and 208 and the merchant 110. In some implementations, data received by the clearance system 212 and the basis for matches determined by the clearance system 212 may be accessible to both the impression providers 206 and 208 and the merchant 110 so that all parties are able to perform independent audits to ensure that matches are being appropriately recognized. The matching process performed by the current system 212 may be similar to matching performed by the merchant computing device 122. For example, information received from the transaction records 124 may compared with information contained within the tokens 120 and 210 in order to determine if a match exists.

Each of the multiple impressions 108 and 204 provided to the customer 102 may also include a code or other source identifier to distinguish the impression provider A 206 from the impression provider B 208. This code may be a number, a phrase, or other piece of information that the customer 102 takes to the merchant 110 and provides during a transaction. In some implementations, providing the code to the merchant 110 may result in a benefit accruing to the customer 102 such as a discount purchase price, accumulation of rewards points, or the like. The merchant 110 includes the code that is part of the transaction information stored in the transaction records 124.

Each of the tokens 120 and 210 may also include the code to identify the respective impression providers 206 and 208 that generated the tokens 120 and 210. The token 120 may include the code associated with the impression provider A 206. Similarly, the token 210 may include the code associated with the impression provider B 208. The matching the code included in the transaction records 124 with one of the codes included in the tokens 120 and 210, it is possible to identify which impression provider 206 or 208 receives attribution for providing the impression 108 or 204 to the customer 102.

Providing code to the merchant 110 may also be implemented by the customer 102 checking in to the merchant 110 either manually or through the use of a signal generated by a mobile device. If the checking in is performed separately from the transaction, the data created by the customer 102 checking in to the merchant 110 in relatively close temporal proximity to the time of the transaction may provide additional confirmation that the customer 102 completed the transaction (i.e., as opposed to another person with the same name and same credit card tail). Checking in to the merchant 110 or providing the code to the merchant 110 may also identify the customer 102 independent of the customer's payment instrument. Thus, transactions with a payment instrument that is not associated with the customer's user account 116 at an impression provider (e.g., cash transactions) can be properly attributed if the customer 102 or a mobile computing device 104 of the customer 102 provides alternative identifying information while at the merchant 110.

The merchant 110 may also pay both impression provider A 206 and impression provider B 208 for providing the respective impressions 108 and 204. Thus, multiple impression providers may each receive attribution for providing an impression based on a single transaction by the customer 102 at the merchant 110. A set payment amount may be shared when token matching indicates that multiple impression providers provided impressions related to a transaction. In this example, since two tokens 120 and 210 match data from the transactions records 124, the payment may be split equally between impression provider A 206 and impression provider B 208. Other allocations of payment are also possible.

Although the clearance system 212 is shown as performing matching in architecture 200 and the merchant computing device 122 is shown as performing matching in architecture 100, either device/system may perform the matching in conjunction with other elements from either architecture 100 or architecture 200. Additionally, in some implementations, the matching may be performed by another system or device such as one of the impression providers 112, 206, or 208, or the computing device 104 of the customer 102.

Illustrative Matching Technique

Figure 3:
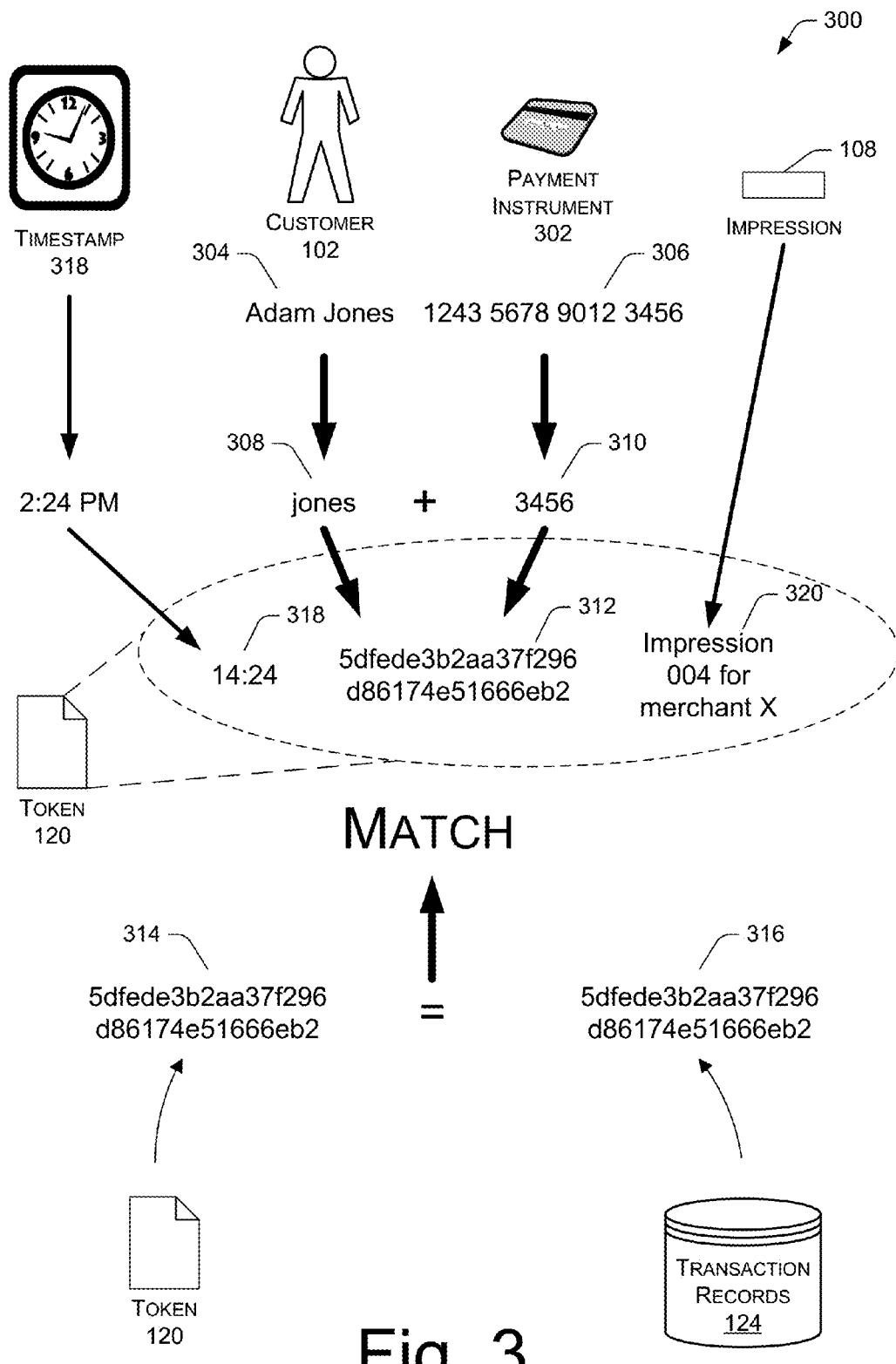
FIG. 3 shows generation of a hash from a customer's name and credit card tail and use of that hash to match a token with a transaction record.

FIG. 3 shows an illustrative technique for identifying a match between information in a token 118 and information in transaction records 124. This technique may be used in conjunction with either of the architectures 100 or 200 shown in FIGS. 1 and 2. The customer 102 is associated with a payment instrument 302. The association may be part of a user account 116 as shown in FIG. 1. Information about the customer 102 includes a name 304, here, "Adam Jones." The payment instrument 302 includes a number 306 such as a 16 digit credit card number. A portion of the name 308 such as the last name and a portion of the payment instrument number 310 such as the credit card tail may be used to generate a one-way hash 312. The algorithm used to generate the hash 312 may be any hashing algorithm such as MD4, MD5, SHA-0, SHA-1, SHA-2, etc. The hash 312 is unique for a given combination of last name 308 and credit card tail 310 while concealing the input information (e.g., jones and 3456).

The token 118 generated by the impression provider 112 may include a user identifier 314 that is generated from information associated with an account of a user who received an online impression such as the impression 108 shown in FIG. 1. The token 118 may include a number of different hash values. There may be a hash value for each combination of the customer's name 304 and each payment instrument number 310 associated with the customer. There may also be hash values generated for other users associated with the customer's account at an impression provider. For example, a family may share a single account at an online merchant or alternatively multiple accounts may be linked together as part of a family or business relationship. In order to capture the instances in which one member of a family, or business, receives an impression and then asks another member to purchase the product, hashes may also be generated using names other than the name 304 of the customer 102. Thus, if a husband is shown an online impression, the resulting token 118 may include hash values for all combinations of the husband's name and his credit cards as well as all combinations of the wife's name and her credit cards. When a token 118 includes multiple hash values, a match with any of those hash values may be interpreted as a match with the token 118.

The transaction records 124 may include a customer identifier 316 of a customer that had a transaction with a merchant. The user identifier 314 and the customer identifier 316 may be generated from the same types of source data (i.e., last names and partial payment instrument numbers) using the same hashing algorithm. Therefore, the user identifier 314 and the customer identifier 316 are identical hash values when the user who received an online impression has the same name 304 and payment instrument number 306 as a customer who conducted a transaction at the merchant. As an additional technique for maintaining security, the impression provider 112 and the merchant responsible for creating the transaction records 124 may periodically change the seed for the hashing algorithm. For example, a timestamp 318, such as the time an impression was provided to the customer or the time the customer completed a transaction with the merchant, may be used as the seed for the hashing algorithm. In order to confirm that the impression provider and the merchant are using the same hashing algorithm may periodically generate test tokens that will match unless the hashing algorithms are different.

The timestamp 318 information may be stored in the token 120 along with the hash 312 and an impression identifier 320 of an impression 108. The impression identifying 320 may uniquely identify a particular one of multiple impressions related to a merchant. Thus, the impression identifier 320 may be used to identify which specific impression leads to the highest conversion rate. The token 120 may also include any number of additional fields or data such as an optional code provided by the merchant (e.g., a coupon code and the like).

When a match is identified, the merchant computing device 122, the clearance system 212, or another system/device may attribute the transaction at the physical location of the merchant to the online impression.

Illustrative Computing Device

Figure 4:
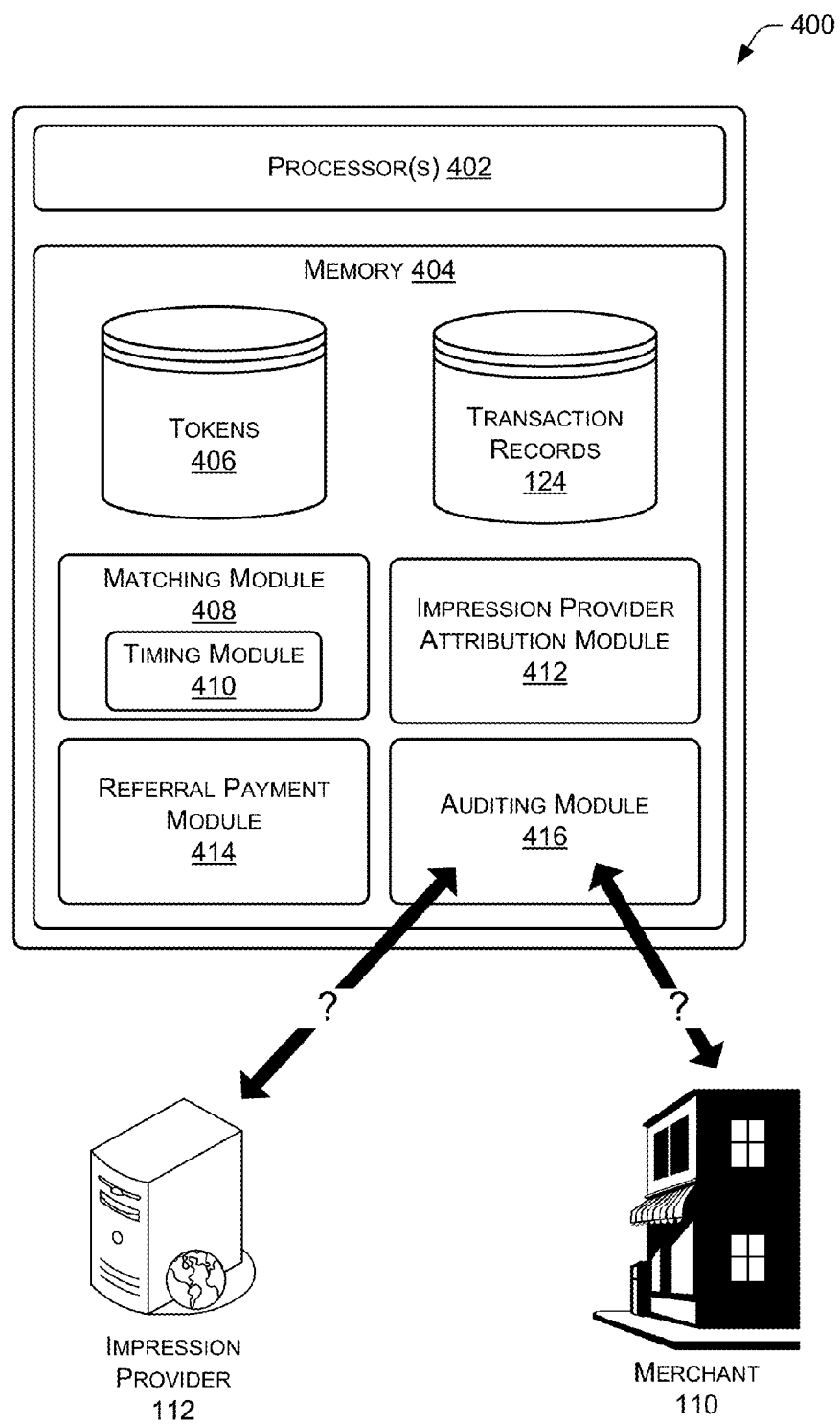
FIG. 4 shows a computing device, such as merchant computing device, from the architectures of FIGS. 1 and/or 2.

FIG. 4 is a schematic representation of a computing device 400 for use in conjunction with the architectures 100 and 200 shown in FIGS. 1 and 2. The computing device 400 may be implemented as the merchant computing device 122, the clearance system 212, another computing device, or a combination of multiple computing devices. Thus, the components shown as being within computing device 400 may, in some implementations, exist in multiple locations as parts of multiple different computing devices. The computing device 400 comprises one or more processors 402 and a memory 404. In some implementations, the memory 404 may be implemented in hardware or firmware. The memory 404 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a processor.

The memory 404 contains or is in communicative connection with a token storage 406. The token storage 406 stores tokens received from one or more impression providers. Each of the tokens may include an impression provider code identifying the impression provider that provided an online impression to a user. The token may also include an identifier of the user (e.g., a hash of name and credit card number), and an identifier of a merchant related to the online impression (i.e., linking the token to the merchant that was promoted on a website). In some implementations, the tokens may additionally include a timestamp indicating when the online impression was provided to the user and additional data such as a unique impression identifier and a coupon code. The tokens may be periodically deleted from the token storage 406 to reduce memory usage and also to minimize or prevent matching of "old" data.

The memory 404 may also contain or be in communicative connection with a transaction record storage 124. The transaction record storage 124 stores transaction data for one or more transactions that occur at one or more physical locations of the merchant. The transaction data may include an identifier of a customer that made the transaction (e.g., such as a hash derived from the customer's name and credit card number), a time of the transaction, and an impression provider code provided by the customer.

The memory 404 also contains a matching module 408. The matching module 408 compares the identifiers of the users in the token storage 406 to the identifier of the customers in the transaction record storage 124. The comparison may identify a match between one of the users that received a particular online impression and a customer that subsequently made a transaction at the physical location of the merchant. The matching may be implemented by a technique similar to that shown in FIG. 3. In some implementations, the matching module 408 may include a timing module 410 that determines how much time has elapsed between the time of the impression and the time of the transaction. The timing module 410 may cause the matching module 408 disregard a match if more than a designated time period has elapsed between the timestamp included in the token and the transaction time at the merchant. For example, the designated time period may be three days, one week, or another length of time.

The memory 404 may also include an impression provider attribution module 412. The impression provider attribution module 412 determines which of multiple impression providers receives attribution for the transaction that matches with one of the tokens in the token storage 406. Identification of the correct impression provider to receive attribution is based on comparison of the impression provider code provided by the customer (and included in the transaction records) with the impression provider codes included in the tokens. The customer may provide the impression provider code to the merchant during the transaction. For example, the customer may verbally inform the clerk at the merchant of the code which the clerk then enters into a point-of-sale device. In other implementations, a mobile electronic device carried by the customer may automatically provide a code to a computing system at the merchant. Thus, the impression provider code provided by the customer identifies which impression provider receives attribution for the transaction conducted at the merchant.

The memory 404 can also include a referral payment module 414. The referral payment module 412 calculates the amount of a payment due from the merchant to the impression providers that receives attribution for the impression. The amount of the payment may be a percentage of the total transaction value, a percentage of the price of one or more products included in the transaction, a flat fee for each impression, etc. In some implementations, the amount of the payment may vary depending of the amount of time that has elapsed between the timestamp included in the token and the transaction time at the merchant. For example, the percentage of the transaction value that is paid out to the impression provider 112 may decrease as the length of time since the impression increases.

The memory 404 of the computing device 400 may also include an auditing module 416. The auditing module 416 provides information to impression providers 112 and to merchants 110 in response to audit requests. The auditing module 416 may expose data contained within the token storage 406 in the transaction records 124. Both impression providers 112 and merchants 110 may access the data used to determine if matches exists and verify that the amount of any payments calculated by the referral payment module 414 are correct. In some implementations, the auditing module 416 may selectively filter information so that a given impression provider 112 or a given merchant 110 only has access to records related to its transactions and/or impressions and is not able to access data related to other impression providers 112 or other merchants 110.

Illustrative User Interface

Figure 5:
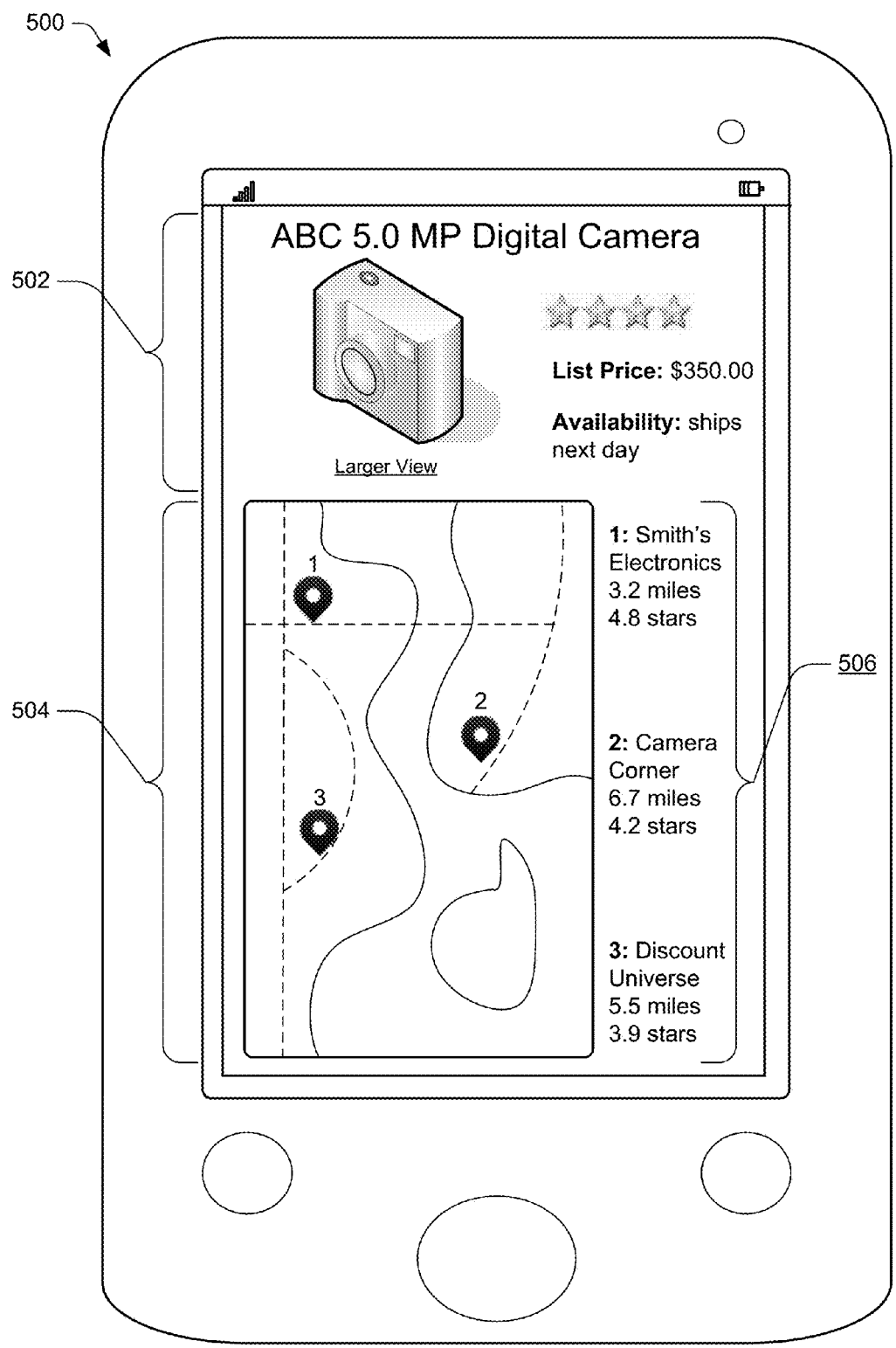
FIG. 5 shows an illustrative user interface on a mobile device that provides an impression related multiple merchants.

FIG. 5 shows an illustrative user interface 500 on a mobile device. In some implementations, the mobile device may be the computing device 104 shown in FIGS. 1 and 2. Although illustrated here on a mobile device, the user interface 500 may also be presented on a non-mobile device such as a desktop computer. A mobile device may also receive browsing results, such as merchant impressions, pushed from a browsing session of a user at another device such as a desktop computer. For example, results from product searches, lists of merchant impressions, or the like may be automatically sent to a mobile device associated with the user's account on the website.

The user interface 500 includes a product display region 502 that shows information about a good or service available for sale to the user. This information may be similar to the type of information provided on an e-commerce website. In some implementations, the user interface 500 may be part of an e-commerce website. With this user interface 500, a user searching for a particular product such as the digital camera shown in the product display region 502 is presented with impressions of local brick-and-mortar merchants from which he or she can purchase the digital camera. In some implementations, the user may choose between purchasing the product online from an e-commerce website or going to one of the physical merchant locations and buying the product. The user interface 500 may provide comparison of total cost of purchase at the e-commerce website and at the various local merchants such as by showing the price at the e-commerce website plus shipping charges together with the prices at the various local merchants plus any applicable sales tax.

The user interface 500 may additionally include a map region 504 that shows the physical locations of one or more local merchants on a map. Identification of which merchants are "local" may be based upon the location information of the user. The user may provide his or her location information directly such as by entering an address or postal code. The location may be based on a shipping or billing address associated with an account of the user. Alternatively, the location may be detected based on an IP address used by the mobile device to connect to a network or via a location determined through a global positioning (GPS) or similar detection system. The map region 504 may include navigation or guidance directing the user to one of the merchant locations shown on the map.

The user interface 500 also includes a merchant listing region 506 that includes an ordered list of merchants selling the product shown in the product display region 502. The ordering of the merchants in the merchant listing region 506 may be based on distance from the user, customer ratings of the merchants by other users, a level of preference of user for the merchants such as listing "preferred" merchants first, conversion rates between online impression and transactions at the physical locations of merchants, prices of the product shown in the product display region 502, business hours, or other factors.

Illustrative Processes

These processes discussed below are each illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Figure 6:
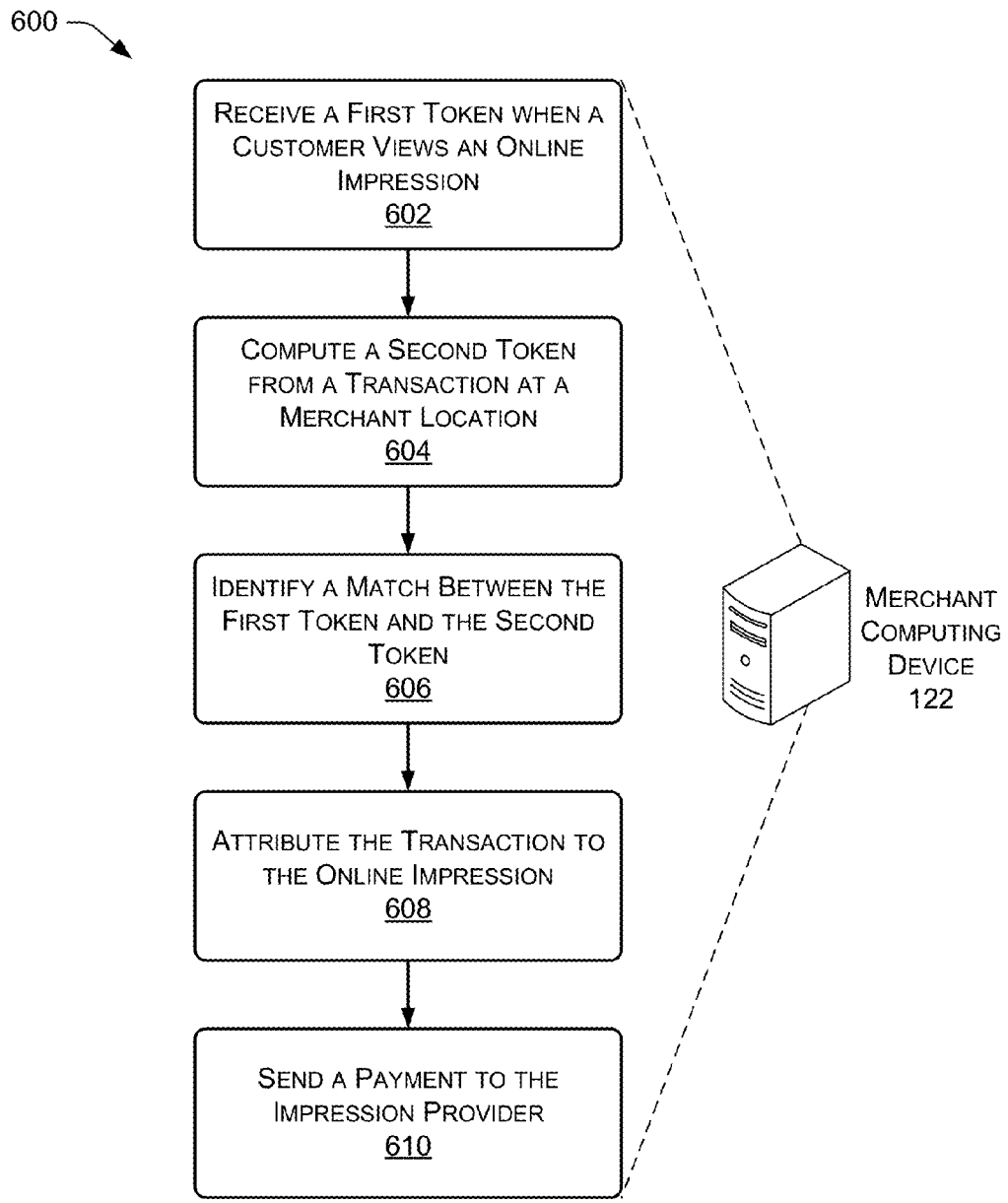
FIG. 6 is a flow diagram of an illustrative process for attributing a transaction at a physical merchant location to an online impression.

FIG. 6 is an illustrative process 600 for attributing a transaction at the physical location of a merchant to an online impression. Process 600 may be implemented in conjunction with the architecture 100 shown in FIG. 1.

At 602, a first token is received from impression provider. The first token may be received by a merchant at a computing device of the merchant. The first token may be generated by the impression provider when an online impression related to the merchant is made to the customer. The online impression may be a listing of the merchant's name, description of a product available for purchase at the merchant, or other information related to the merchant. In implementations in which the online impression is presented to the customer together with a product, for example a product displayed on a webpage, an identifier for that product (e.g., a product number) may also be included in the first token. The first token may additionally include a customer identifier for the customer and a timestamp indicating the time when the online impression was made to the customer.

At 604, a second token including a customer identifier that is derived from a transaction conducted at a physical location of the merchant is computed. The customer identifier derived at the merchant may be based on the name of the customer and/or a payment instrument used by the customer to pay for the transaction. The transaction conducted at the physical location of the merchant may be a transaction in which the customer purchases a product from the merchant with a payment instrument that is also associated with an account of the customer on with the impression provider. For example, the impression provider may have a list of one or more of the customer's credit cards and the customer uses one of those credit cards to pay for the transaction at the merchant.

At 606, a match is identified between the first token and the second token. The match between the tokens may be based in part on an underlying match between the customer identifiers. In some implementations the impression provider and the merchant may use the same hashing algorithm to generate hashes of the customer identifiers. Thus, customer identifiers may be determined to match when the hash values are the same. Matching customer identifiers may be considered as matching only when the transaction at the merchant occurs within a predetermined time period after the time indicated on the timestamp in the token. Thus, matches occurring after the predetermined time period may be disregarded.

At 608, the transaction conducted at the physical location of the merchant is attributed to the online impression. In other words, the correlation between the matching tokens may be assumed to indicate a causal relationship between the customer viewing the online impression and making a purchase at the merchant.

At 610, a payment is sent from the merchant to the impression provider in response to the attribution at 608. Thus, the merchant may pay the impression provider for providing the impression to the customer if and when the customer makes a transaction at the merchant. The amount of the payment may be based on an amount of the transaction. For example, the impression provider may receive a percent of the transaction value as a commission or referral fee.

Figure 7:
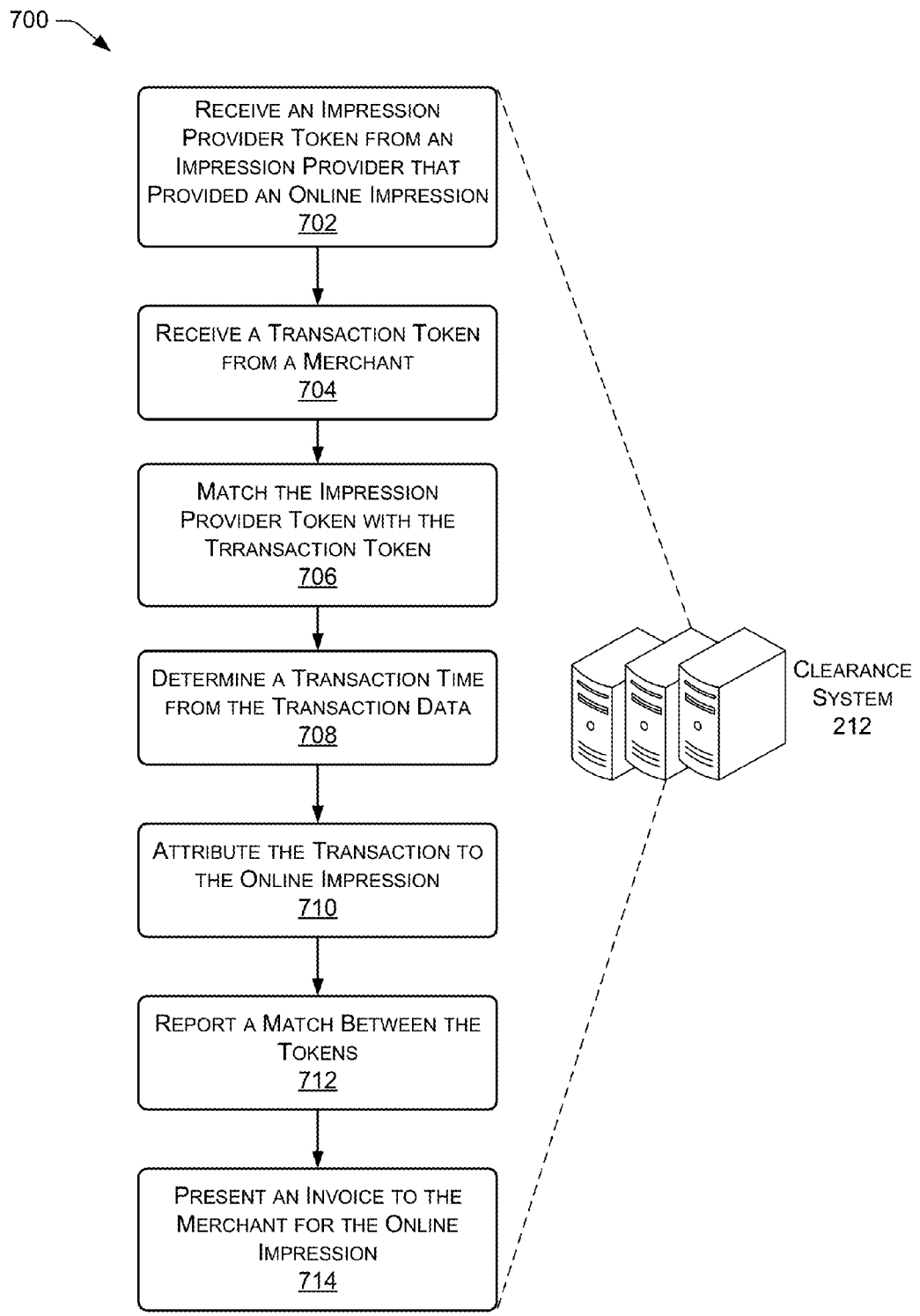
FIG. 7 is a flow diagram of another illustrative process for attributing a transaction at a physical merchant location to an online impression.

FIG. 7 is a further example of a process 700 for attributing a transaction at the physical location of a merchant to an online impression. Process 700 may be implemented in conjunction with the architecture 200 shown in FIG. 2.

At 702, an impression provider token is received from an impression provider at a clearance system. The impression provider token may include a unique customer identifier and a timestamp indicating a time when the online impression related to a merchant was made to a customer.

At 704, the clearance system may receive a transaction token from one or more transactions conducted at a physical location of a merchant. The transaction token may include transaction data such a credit card information related to the transaction and the transaction data may be transmitted from a point-of-sale device at the merchant location to a credit card interchange. The credit card interchange may provide the transaction data to the clearance system. In some implementations, all or part of the clearance system may be included within the hardware and software of the credit card interchange. Tokens received by the clearance system and transaction data from one or more merchants received by the clearance system are available for audit by either an impression provider or by a merchant.

At 706, the impression provider token is matched with the transaction token. The tokens may be matched based on a comparison of a unique customer identifier with the user identifier. The customer identifier name may be derived by any of the techniques discussed above such as by creating a hash from a combination of the customer's name and a partial credit card number. Alternatively, the customer identifier may simply be the customer's name, a membership or loyalty number associate with the merchant, an RFID or serial number of a mobile device of the customer, or some other identifier. Each of these identifiers may be hashed, encrypted, or otherwise modified. In some implementations, partial matches may be accepted as a match. For example, common variations of a name (e.g., Ben and Benjamin) may be accepted as a match.

At 708, it is determined that the transaction occurred within a predetermined time window following the time indicated on the timestamp in the token by comparison with a transaction time included in the transaction data. The determination may be computed by adding the length of the predetermined time window to the time indicated on the timestamp to generate a cutoff time and comparing the transaction time to the cutoff time.

At 710, the transaction conducted at the physical location of the merchant is attributed to the online impression related to the merchant. In some scenarios such as market research or within portions of the same company (e.g., a merchant with an e-commerce website and brick-and-mortar stores), attribution may simply be recorded and noted without any subsequent payment of an advertising or referral fee.

At 712, the match identified at 706 between the two tokens is reported to the impression provider and to the merchant. The reporting may be in real-time as the matches occur or data may be batched and reported periodically such as once per day.

At 714, an invoice is presented to the merchant for payment to the impression provider. The amount of the payment may be based on a value of the transaction conducted at the merchant. The value of the transaction may be included as part of the transaction data received at 704.

Figure 8:
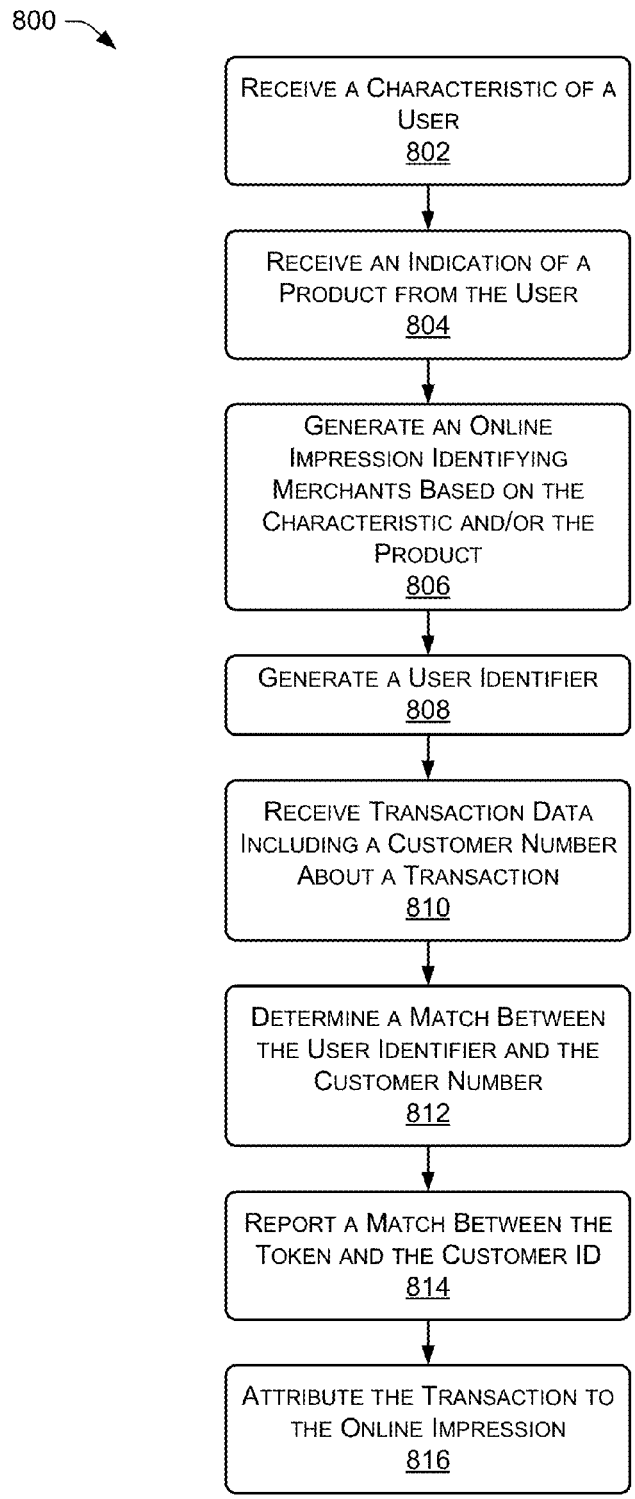
FIG. 8 is a flow diagram of yet another illustrative process for attributing a transaction at a physical merchant location to an online impression.

FIG. 8 is another illustrative process 800 for attributing a transaction at the physical location of a merchant to an online impression. Process 800 may be implemented in conjunction with the user interface 500 shown in FIG. 5.

At 802, a user characteristic is received. The user characteristic may be a location, a preferred merchant or merchants, a wish list or shopping list, a transaction history (online or offline), or another characteristic. When the user characteristic is a location, the user may explicitly provide the indication by entering an address or postal code in a Web form. The location may also be provided by a mobile device such as by sending location determined through GPS technology to a recipient across a wireless connection.

At 804, an indication of a product is received from the user. The indication may be generated by the user viewing a product information page. For example, the user may view a webpage of an online merchant that is displaying the product for sale. Alternatively, the indication may be generated by the user selecting a product from a list, including the product in a wish list or shopping list, purchasing a related product, or by any other direct or indirect way the user indicates a particular product.

At 806, an online impression is generated for presentation to the user. The online impression may identify one or more merchants. In some implementations, the online impression may be a list of the merchants. The list of merchants may include the merchants in a particular order determined by a characteristic of the respective merchants such as by price, customer reviews, etc. The merchants included in the online impression are selected for inclusion based on the user characteristic received at 802 and/or the indication of the product received at 804. The online impression may also include a map of the physical locations of the merchants such as the map shown in FIG. 5.

At 808, a user identifier is generated with a predetermined algorithm based on the name of the user and a payment instrument associated with the user. The predetermined algorithm may be a hashing algorithm. One technique for generating a user identifier is shown in FIG. 3.

At 810, transaction data is received from one of the merchants included in the online impression at 806. The transaction data is related to a transaction that occurred at a physical location, as opposed to a web-based transaction, of the merchant. The transaction data may include a customer identifier generated by the same algorithm used to generate the user identifier at 808. The basis for the customer identifier may also be the same as for the user identifier, specifically the name of the customer and a payment instrument used by the customer to pay for the transaction.

At 812, a match is determined between the user identifier generated at 808 and the customer identifier received at 810. When the same algorithm is used to generate the respective identifiers and both identifiers are based on a combination of a name and a payment instrument, the match at 812 indicates that the user and the customer are the same and that the payment instrument used to pay for the transaction at the merchant is one of the payment instruments associated with the user.

At 814, the transaction at the merchant is attributed to the online impression. In some implementations, the attribution may be verified by the customer by confirming that he or she in fact made a purchase at the physical location of the merchant. Customer verification may be provided by the customer logging in into the online merchant that provided the impression at 804 and entering a review of the product or an evaluation of the local merchant. Verification may also be provided by the customer and a photograph or a scan of a receipt for the transaction and uploading that image to the online merchant or to a clearance service. Customer verification may be implemented based on the transaction value (e.g., needed for transactions over $1000) or based on statistical analysis of transactions and payments at a particular local merchant. For example, if there is significant statistical deviation from reported behavior at other similar local merchants, the impression provider may wish to receive additional confirmation to determine if some of the reported matches are fraudulent.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. One or more non-transitory computer-readable storage media storing computer-executable instructions that, when executed by one or more processors, instruct a computing device to perform acts comprising:
   receiving an indication of a location from a user device;
   receiving an indication of a product from the user device;
      generating, for presentation to the user device, an online impression identifying a plurality of merchants that are selected for inclusion in the online impression based at least in part on the location and the product;
   generating a user identifier with a first predetermined algorithm;
   receiving transaction data from a merchant of the plurality of merchants that describes a transaction that occurred at a physical location of the merchant, the transaction data including a customer identifier generated by a second predetermined algorithm that corresponds to the first predetermined algorithm;
   determining a match between the user identifier and the customer identifier; and
   attributing the transaction at the physical location of the merchant to the online impression.

2. The one or more non-transitory computer-readable storage media recited in claim 1, the acts further comprising receiving an identity of the product from the merchant that has provided an indication of the product to the user device.

3. The one or more non-transitory computer-readable storage media recited in claim 1, wherein the online impression comprises a map showing a physical location of at least the merchant of plurality of merchants.

4. The one or more non-transitory computer-readable storage media recited in claim 1, wherein the online impression comprises an ordered list of the plurality of merchants.

5. The one or more non-transitory computer-readable storage media recited in claim 4, wherein an ordering of the ordered list of the plurality of merchants is based at least in part on locations of the plurality of merchants, prices of the product at the plurality of merchants, customer ratings of the plurality of merchants, or conversion rates between online impressions and transactions at the physical locations of the plurality of merchants.

6. The one or more non-transitory computer-readable storage media recited in claim 1, wherein the user identifier is based at least in part on a name of a user and a payment instrument associated with the user and the customer identifier is based at least in part on a name of a customer and a payment instrument used by the customer to pay for the transaction.

7. The one or more non-transitory computer-readable storage media recited in claim 1, wherein the first predetermined algorithm comprises a first hashing algorithm and the second predetermined algorithm comprises a second hashing algorithm.

8. A system comprising:
one or more processors; and
one or more computer-readable media storing instructions that, when executed by the one or more processors, cause the one or more processors to perform acts comprising:
  receiving an indication of a location from a user device;
  receiving an indication of a product from the user device;
  generating, for presentation to the user device, an online impression identifying at least a merchant that is selected for inclusion in the online impression based at least in part on the location and the product;
  generating a user identifier;
  receiving transaction data from the merchant, the transaction data describing a transaction that occurred at a physical location of the merchant and including a customer identifier;
  determining that the user identifier corresponds to the customer identifier; and
  attributing the transaction at the physical location of the merchant to the online impression.

9. The system as recited in claim 8, the acts further comprising receiving an identity of the product from the merchant that has provided an indication of the product to the user device.

10. The system as recited in claim 8, wherein the online impression comprises a map showing a physical location of at least the merchant.

11. The system as recited in claim 8, wherein the online impression comprises an ordered list of merchants including the merchant and at least one additional merchant.

12. The system as recited in claim 9, the acts further comprising ordering of the ordered list of merchants based at least in part on a location of the merchant, a price of the product at merchant, a customer rating of the merchant, or a conversion rate between online impressions and transactions at the physical location of the merchant.

13. The system as recited in claim 8, wherein:
generating the user identifier comprises generating the user identifier based at least in part on a name of a user and a payment instrument associated with the user; and
the customer identifier is based at least in part on a name of a customer and a payment instrument used by the customer to pay for the transaction.

14. The system as recited in claim 8, wherein:
generating the user identifier comprises generating the user identifier using a first predetermined algorithm; and
the customer identifier is generating using a second predetermined algorithm that corresponds to the first predetermined algorithm.

15. A method comprising:
receiving an indication of a location from a user device;
receiving an indication of a product from the user device;
generating, for presentation to the user device, an online impression identifying at least a merchant that is selected for inclusion in the online impression based at least in part on the location and the product;
generating a user identifier;
receiving transaction data from the merchant, the transaction data describing a transaction that occurred at a physical location of the merchant and including a customer identifier;
determining that the user identifier corresponds to the customer identifier; and
attributing the transaction at the physical location of the merchant to the online impression.

16. The method as recited in claim 15, further comprising receiving an identity of the product from the merchant that has provided an indication of the product to the user device.

17. The method as recited in claim 15, wherein generating the online impression comprises generating a map showing a physical location of at least the merchant.

18. The method as recited in claim 15, wherein generating the online impression comprises generating an ordered list of merchants including the merchant and at least one additional merchant.

19. The method as recited in claim 15, wherein:
generating the user identifier comprises generating the user identifier based at least in part on a name of a user and a payment instrument associated with the user; and
the customer identifier is based at least in part on a name of a customer and a payment instrument used by the customer to pay for the transaction.

20. The method as recited in claim 15, wherein:
generating the user identifier comprises generating the user identifier using a first predetermined algorithm; and
the customer identifier is generating using a second predetermined algorithm that corresponds to the first predetermined algorithm.

* * * * *